Sept. 1, 1964 S. SILBERG 3,147,339

MESSAGE DISTRIBUTION SYSTEM

Filed Jan. 15, 1962 3 Sheets-Sheet 1

INVENTOR
SYLVAN SILBERG

BY R. C. Terry
ATTORNEY

MESSAGE DISTRIBUTION SYSTEM

Filed Jan. 15, 1962 3 Sheets-Sheet 2

INVENTOR
SYLVAN SILBERG
BY R.C. Perry
ATTORNEY

INVENTOR
SYLVAN SILBERG
BY R. C. Terry
ATTORNEY

United States Patent Office 3,147,339

Patented Sept. 1, 1964

3,147,339

MESSAGE DISTRIBUTION SYSTEM

Sylvan Silberg, Skokie, Ill., assignor to Teletype Corporation, Skokie, Ill., a corporation of Delaware Filed Jan. 15, 1962, Ser. No. 166,286
2 Claims. (Cl. 178—4.1)

This invention relates to a message distribution system for distributing telegraph messages to selected receiving devices in accordance with address codes preceding each message identifying its source and, more particularly, to a message distribution system in which the address codes which are used to select the receiving devices are preserved and are transmitted to the selected receiving devices with the ensuing messages.

Systems using address codes to identify a particular message and/or to select particular receiving devices have been used prior to this invention. Generally the address code caused energization of suitable relays or electronic circuitry in order to effect a turning on of the selected receiving apparatus so that it could then receive the message following the code. In this type of system the address code itself was lost as far as reception by the receiving apparatus was concerned. For many applications this loss of the address code has no disadvantages and the address code is in fact not wanted by the receiver apparatus. However, there are some situations in which it is necessary for the selected receiver to receive the address code as a part of the message in order to identify or to associate the message with its source or intended receivers. One system in which it is desirable to retain the address code as a part of the received message is a system employed in transmitting and receiving weather information such as shown in copending application of J. T. Auwaerter et al., Serial No. 166,098, filed January 15, 1962. The weather information following an address which identifies the source of the information would be completely useless without the source identifying address. As an example, suppose that a receiver is interested in the weather from several weather stations including Boston, New York, Cincinnati, etc. If the information from each of these stations is not identified by designating the weather station from which it originated, it is impossible for an operator at the receiver to tell from which of the stations any particular weather information originated; and thus the information is useless.

Therefore, a system for distributing weather information. or other information in which it is necessary to identify the source of the message, must employ some means for retaining the address preceding the message for subsequent redistribution along with the message, while still using the address to determine which receiver or receivers are to be supplied with the ensuing message. One means by which this has been done in the past was to supply the address to two parallel systems. The first of these parallel systems activated or conditioned the particular receivers which were to receive the message in the same manner as is done in systems where the address is used merely as the conditioning code and is subsequently lost. The second of these parallel systems was used to store the address for retransmission to the receivers prior to the transmission of the message. In order to achieve this result it was necessary to use an additional reperforator transmitter (reader) for temporarily storing and supplying the address codes. Following the receipt of the address which conditioned the receivers and which was stored in tape by the additional reperforator, supply of the message from the line tape transmitter was temporarily stopped and the storage transmitter supplied the address code to the selected receivers. The circuit was then switched back to the original transmitter for supply of the remainder of the message.

This type of system involves two reperforator transmitters for distribution of messages received on the line. The first of these receives all the line signals which include the address codes and the messages. The second reperforator transmitter is responsive to only the address codes, and some means is necessary to effect switching back and forth between these two systems in order to supply both the address and the message to the selected receivers. While systems of this type give satisfactory operation and results, they are wasteful of equipment in that duplication of the reperforator transmitter is necessary. There is also a loss in time since the address code in effect must be repeated for each message. The first time it conditions the desired receivers, and then it is repeated prior to the message supplied to the receivers.

It is an object of this invention to provide a message distribution system for distributing telegraph messages to selected receiving devices in response to address codes in which the address codes are supplied prior to the message without loss thereof and without duplication of the reperforator transmitter equipment.

It is another object of this invention to use a plurality of parallel storage devices, equal in number to the number of levels in the particular permutative telegraph code used, for temporarily storing an address code combination which may be used to select particular utilization devices or receivers without loss of the address code which is then supplied to the selected utilization devices from the storage devices as a part of the message.

In a preferred embodiment of this invention, a distribution system for use with a telegraph communication system utilizes a plurality of multistage shift registers arranged in parallel with one shift register being connected to receive each level of a permutative telegraph signal representing a character. The final stages of these shift registers supply the telegraph signal to utilization apparatus such as reperforators or printers. The signal arriving at these reperforators or printers is exactly the same as would normally be supplied directly from a receiver distributor or a tape reader with parallel wire output, but it is delayed because of the shift registers. In this manner the output of the distributor, including all the original signals, is supplied to the utilization apparatus. During the time that the signals are passing through the registers, an opportunity is present to read the outputs of the registers in order to determine what is stored therein.

In accordance with this invention the number of stages in the registers is chosen to be such that they may store all the characters used in address code combinations for the system plus having one extra buffer stage. When a complete address has been supplied to the shift registers and is stored therein, the shift register stages storing the address are read in parallel and sampled in an address selection circuit which determines the particular address which the registers contain. The output of the address selection circuit is then supplied to the utilization devices to condition them for reception of the ensuing message preceded by the address.

The message follows the address and is supplied to the shift registers in the same manner as the address was supplied thereto. The address followed by the message is shifted out of the storage stages of the registers to the buffer stage from which it is supplied to the utilization devices which have been conditioned to receive it.

Other objects of this invention will become apparent upon consideration of the following detailed specification taken in conjunction with the attached drawings in which.

The following detailed explanation of this invention is directed to a specific embodiment in which 1200 different address code combinations are used to identify the messages. Each of the address code combinations consists of four characters or less, and both the addresses and the messages are encoded in a five-level permutative binary code. The number of different address code combinations, the number of characters in each address code combination, and the number of levels in the permutative binary code may all be varied to suit particular situations in which the invention may be used.

Figure 1:
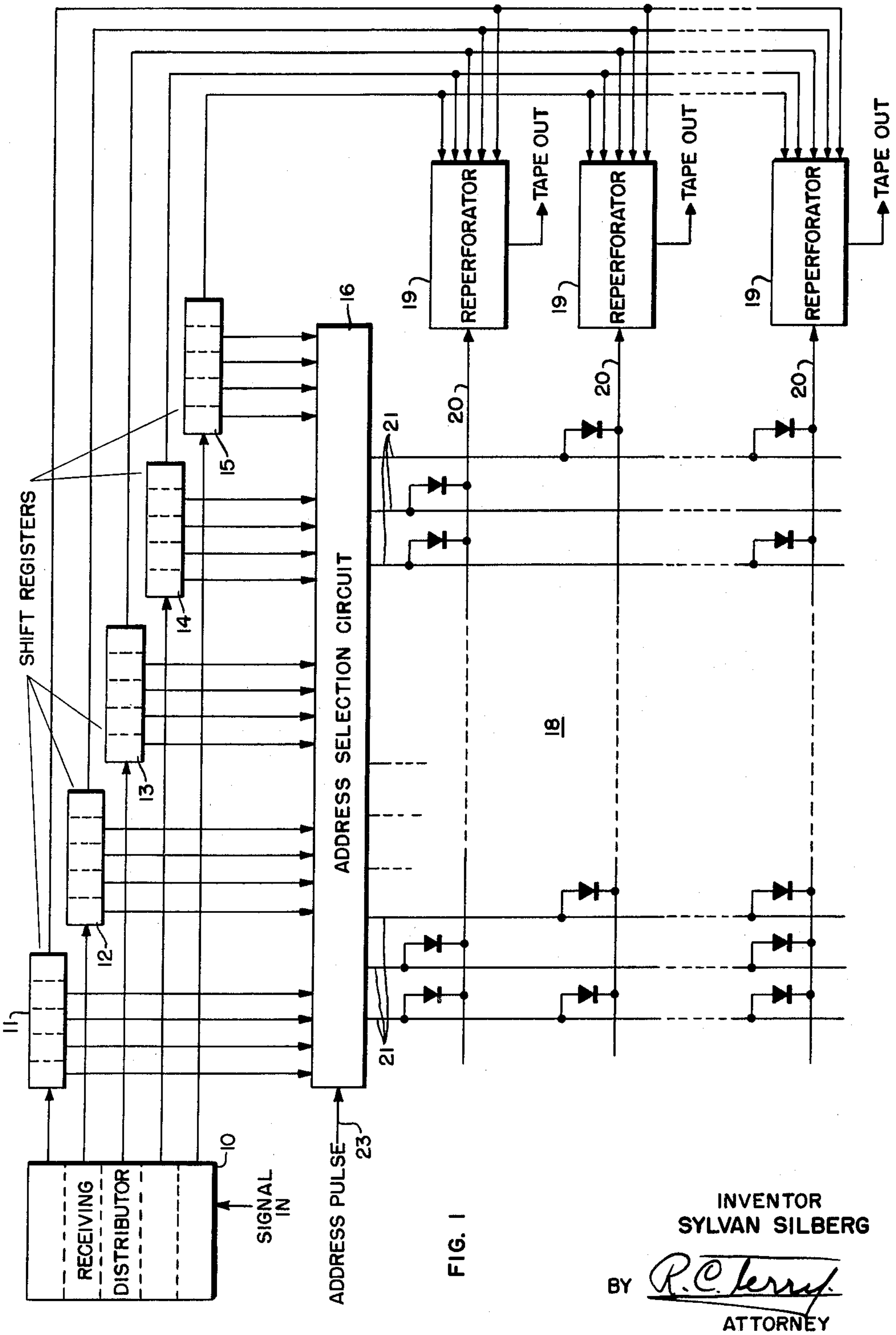
FIG. 1 is a block diagram of a preferred embodiment of this invention.
Figure 2:
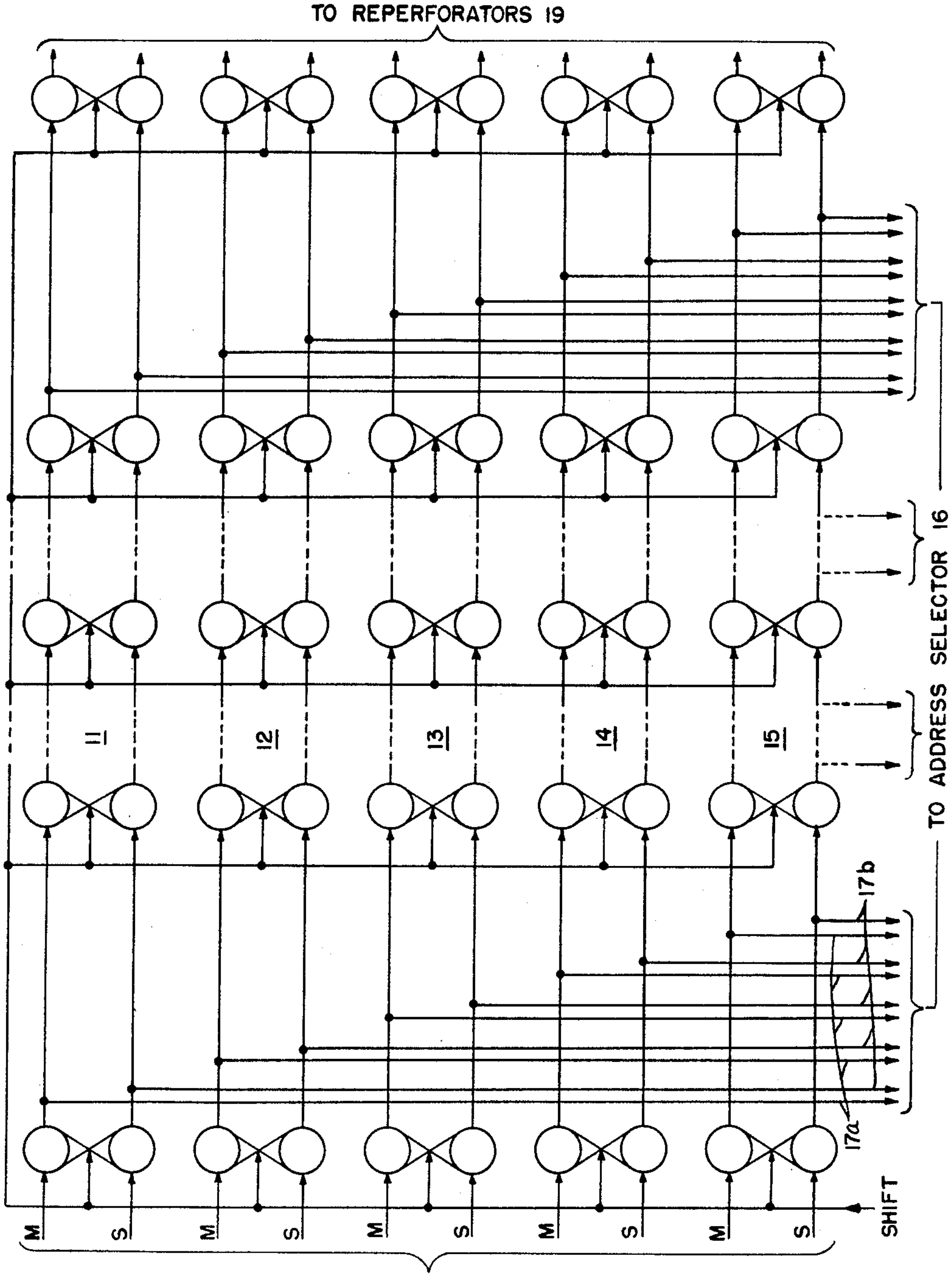
FIG. 2 is a more detailed circuit diagram of the shift register circuits of FIG. 1.
Figure 3:
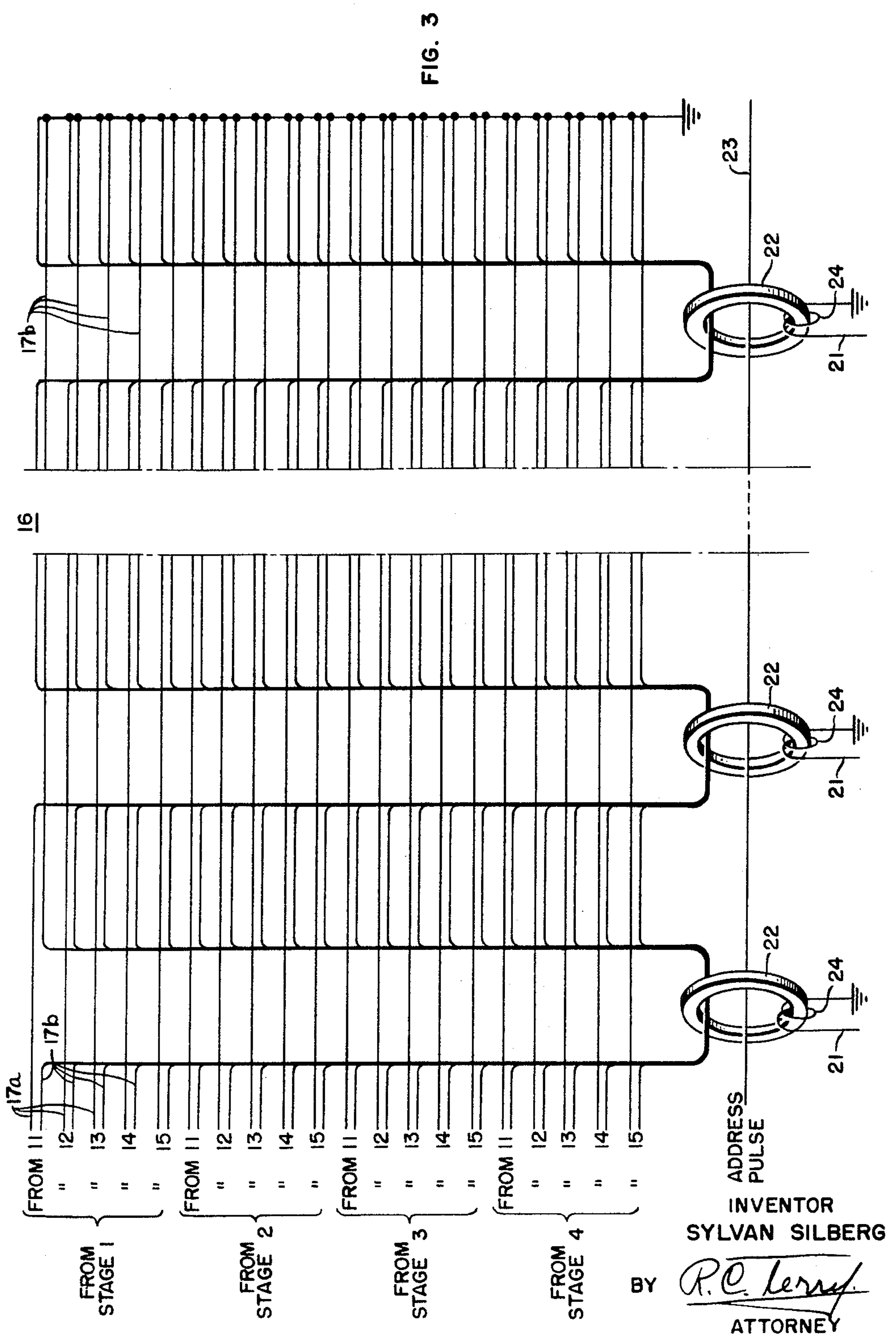
FIG. 3 is a detailed circuit diagram of a portion of the address selection circuit of FIG. 1.

Referring now to the drawings there is shown in FIG. 1 a high speed receiving distributor 10 with parallel wire output of a type common in the art such as shown in FIGS. 2, 3 and 4 of Patent No. 3,001,010, issued September 19, 1961 to J. P. Mahony et al. For the purposes of this explanation let it be assumed that telegraph signals in five-level Baudot code are being supplied in series to the distributor 10 which converts these signals to parallel form in the manner shown in FIG. 4 of the above-mentioned patent. The outputs of the receiving distributor 10 will be sampled at the end of each received character to form a parallel output signal having five levels representing the complete character.

Each level of this parallel output is then supplied to a first stage of a different five stage shift register 11, 12, 13, 14 or 15. For example, the first level is supplied to the first stage of shift register 11, the second level to the first stage of shift register 12, etc., with the fifth level being supplied to the first stage of shift register 15. Let it be further assumed that the address code which designates the source of the message and which is used to select the particular utilization circuits which are to receive the message is a four-character code. The first character is initially stored in the first stages of shift registers 11 to 15; the second character is then supplied to the shift registers and is stored in the first stages with the first character being shifted to the second stages. After four characters have been received they will be stored in the first four stages of shift registers 11 to 15.

When the address code has thus been stored in shift registers 11 to 15, the outputs of these registers are sampled in an address selection circuit 16 by an address pulse applied to line 23. The operation of the address selection circuit 16 is such that application of an address pulse to the line 23 will cause one particular output lead 21 from the address selection circuit 16 to be energized corresponding to the address code stored in the first four stages of the shift registers 11 to 15. Assume that there are 1200 different possible addresses to be selected by the address selection circuit. Only one of these 1200 possible addresses will have its output lead 21 energized at any one time upon the application of an address pulse to the line 23.

Output lines 21 representative of these 1200 possible address selections are supplied to a matrix circuit 18. Selective energization of a plurality of reperforators or receiving and translating devices 19 is obtained from the matrix 18 by means of lines 20 connected to the particular output leads 21 from address selection circuit 16 which are representative of the addresses preceding the messages it is desired for the selected devices 19 to receive. The connections between lines 20 and output leads 21 are made by the use of conventional cross point diodes. It is possible to energize any one of the reperforators 19 upon reception of a number of different addresses as is readily apparent by reference to the drawing where it is seen that cross point diodes connect each of the lines 20 to a plurality of different output leads 21. The addresses to which a particular reperforator 19 is responsive may be changed easily by insertion or removal of a cross point diode at any junction of leads 21 and the line 20 connected to that reperforator.

Energization of the selected reperforators 19 from matrix 18 occurs just after the receipt of the fourth address character. The first message character will then follow this address thus shifting the first of the address characters to the fifth stage of shift registers 11 to 15. This fifth stage of shift registers 11 to 15 acts as a buffer stage and merely delays the application of the signal to reperforators 19 by one character interval in order that the conditioning energization of the selected reperforators 19 may be completely carried out prior to application to the line of the first character of the address. When the second character of the message is applied to the first stages of shift registers 11 to 15, the first character of the address is being applied to all reperforators 19, but only the selected reperforators will perforate tape with the address code followed by the message.

While the proceeding explanation of this system considers a receiver distributor with parallel wire output as the input to the system, it will be apparent to those skilled in the art that the input to the system could be a tape reader with parallel wire output in place of the receiver distributor 10 and could then use punched tape as an input source instead of a series telegraph input signal as described. If a tape reader were substituted for distributor 10, its output would be read in parallel for each line or character and supplied to the first stages of the shift registers 11 to 15 in the manner shown in the drawing. The reperforators 19 may also be replaced by suitable telegraph printers or other receiving devices if retransmission or storage on tape of the message is not desired.

FIG. 2 shows in greater detail the arrangement of shift registers 11 to 15. Each stage of each of these shift registers consists of a bistable flip-flop circuit which is represented symbolically in FIG. 2 by showing each active element and its associated circuitry as a circle, with the two elements comprising the flip-flop vertically disposed one above the other and interconnected by two lines crossed in an X configuration. An input applied to the control electrode of only one of the active elements has been designated by a line connected directly to the circle representing that particular active element. An input which is symmetrically applied to the flip-flop, that is an input applied to the control electrodes of both active elements, is shown in the drawing as being connected to the center or cross point of the X configuration interconnected the two circles representing the active elements. An output from either of the active elements of the flip-flop is shown by a line connected from the circle representing the element from which it is taken.

The above-described designation for a flip-flop has been used instead of a box merely labeled "FF" or "flip-flop" in order to avoid confusion over which input pulses are applied to which active element and from which particular active elements the outputs are obtained, yet avoiding the detailed circuit diagram of a conventional flip-flop circuit. The particular configuration shown was chosen since it represents, symbolically, rather closely the common Eccles-Jordan circuit; the circles represent tubes, transistors or other suitable devices, and the crossed lines interconnecting them are representative, for example, of the interconnections in the Eccles-Jordan circuit between the anode of one tube and the grid of the other or the collector of one transistor and the base of the other.

For the particular application in which the shift registers 11 to 15 are being used, it is desirous that there be no delay in shifting the information to succeding stages of the registers. In order to accomplish this type of operation, the outputs of the receiving distributor 10 are applied simultaneously as priming potentials to the first stages of shift registers 11 to 15.

Each level of the receiving distributor 10 has two outputs; one for mark and another to designate space. If the receiving distributor 10 is reading a mark in any level, a priming potential is supplied to the upper element of the flip-flop associated with that level; and if the distributor is reading a space in any level, a priming potential is supplied to the lower element of the flip-flop associated with that level. In a similar manner priming potentials are applied from each stage of shift registers 11 to 15 to the next succeeding stage, with a mark stored in any stage causing a priming potential to be applied to the upper element of the next succeeding stage and with a space stored in any stage causing a priming potential to be applied to the lower element of the next succeeding stage.

When a shift or timing pulse is supplied simultaneously to all of the stages of all the shift registers, it causes any stage to which it is supplied to assume a mark or space condition in accordance with the printing signal which has been applied to that stage from the next preceding stage. For example, assume that the first stage of shift register 11 has stored a mark. This causes a priming potential to be applied from the upper element of that stage to the upper element of the second stage of shift register 11. Coincidence between this priming potential and the shift pulse supplied to the second stage of shift register 11 causes the second stage to attain a mark condition. Since all of the stages in the shift registers 11 to 15 are comprised of flip-flop or bistable devices, it is possible for only one priming potential to be applied from any given stage to the next succeeding stage at any one time, and coincidence between this priming potential and the shift pulse is necessary to set a particular stage to store the information which was previously stored in the preceding stage. It is also to be noted that only one priming potential per level is supplied from the receiving distributor 10 to the first stages of the shift registers 11 to 15 thus priming them in the same manner that each stage of the registers primes its next succeeding stage.

An output lead 17*a* or 17*b* is connected from each element of each of the first four stages of the shift registers 11 to 15 to the address selection circuit 16 shown in FIG. 3. The outputs from each element of the fifth stage are supplied to the reperforators 19.

After four characters designating address code combinations have been supplied to the shift registers 11 to 15, the forty leads 17*a* and 17*b* connected from the first four stages convey the information necessary in order to decode the stored address. The first character of the address is stored in the fourth stages of shift registers 11 to 15 and may be determined from the five pairs of leads 17*a*, 17*b* connected from the fourth stages to address selector circuit 16. In a similar manner, five pairs of leads are connected from each of the first, second, and third stages of shift registers 11 to 15 to the address selector 16. One lead 17*a* connected from each stage of each register designates, when not energized, that a mark is stored in that particular stage, and the other lead 17*b* connected from each stage of each register designates, when not energized, that a space is stored in that particular stage. For example, if the first stage of shift register 11 is storing a mark, current will flow in lead 17*b* connected to that stage and no current will flow in lead 17*a*; if the first stage of shift register 11 is storing a space, current will flow in lead 17*a* and no current will flow in lead 17*b*.

In FIG. 3 the forty output leads 17*a* and 17*b* from the first four stages of shift registers 11 to 15 are shown as being connected to the address selection circuit 16. In order to determine which one of the 1200 addresses is stored in the registers, 1200 magnetic cores 22 are provided in address selector circuit 16. One of the two output leads 17*a* or 17*b* from each stage of each register is passed through each of these 1200 cores resulting in twenty of the forty leads 17*a* and 17*b* passing through each of the cores 22. A different combination of twenty of the forty leads 17*a* and 17*b* is supplied to each different core 22.

In FIG. 3 assume that the upper lead 17*a* of each lead pair represents a mark stored in the particular stage from which it is connected and that the lower lead 17*b* of each pair represents a space. The left-hand core 22 is then threaded by the twenty leads 17*b* which represent space stored in all four stages of each of the five shift registers 11 to 15. The second magnetic core 22 is shown in the drawings as being threaded with the upper lead 17*a* of the first stage of shift register 11 and with the lower leads 17*b* of all the remaining stages of the shift registers 11 to 15. Thus this core is connected to the outputs representing a mark in the first stage of shift register 11 and space in all the remaining stages of registers 11 to 15. The interconnections of the shift registers 11 to 15 and the remainder of the 1200 cores 22 result in a total of 1200 different combinations of mark and space which represent the addresses which may be stored in the first four stages of shift registers 11 to 15. The final core 22 shown on the right in FIG. 3 is threaded by the twenty leads 17*a* representing mark stored in all four stages of the shift registers 11 to 15.

Each of the cores 22 also has threaded therethrough a line 23 through which the address pulse signal is supplied. Line 23 is wound through the cores 22 in such a manner that a current directed through it by the application of address pulses causes a flux in the cores 22 in a direction opposite to that caused by the current flowing in the output leads 17 from the shift registers 11 to 15. The magnitude of the flux caused in cores 22 by address pulses passing through line 23 is such that it is insufficient to overcome the opposing flux established in any core 22 by the outputs of the shift registers 11 to 15 if any one of the leads 17 threaded through that core from the shift registers has a current flowing through it. Only the particular core 22 which is threaded by all the leads 17*a* and/or 17*b* connected from the elements of the stages in shift registers 11 to 15 containing the address has no reverse current flux established in it from the output leads from registers 11 to 15 since no current flows through the leads representing the address.

Immediately following the reception of the fourth character of an address code and prior to reception of the next character of the ensuing message, an address pulse is applied to line 23. The magnitude of this address pulse is insufficient to overcome the reverse current flux caused in any cores 22 having current flowing through them from the output of shift registers 11 and 15, and thus no output pulse is obtained from windings 24 of those cores. However, an output pulse is obtained from the one core 22 which designates the address and which therefore does not have a reverse current flux imposed upon it from shift registers 11 to 15.

The output winding 24 of this core then supplies a pulse to the particular lead 21 in the matrix 18 which corresponds with the desired address. This pulse is then applied, as has been previously explained, from the matrix 18 to energize or condition the desired reperforators 19 which are to receive the message. The energizing pulse may accomplish this conditioning by triggering a clutch engagement relay or circuit which renders the selected reperforators 19 responsive to the line signals from the fifth stages of registers 11 to 15.

The address pulses applied to the line 23 which pass through cores 22 effectively operate to reset the cores to prepare the address selector circuit 16 for reception of the next address from shift registers 11 to 15. However, if it is so desired an additional reset pulse could be applied to cores 22 after an address pulse is applied to the line 23.

No circuitry for producing the shift pulses for registers 11 to 15 or the address pulses applied to the line 23 has been shown since such timing circuits do not form a part of this invention and are well known in the art. Since this system must operate in synchronism with the high speed distributor 10, such shift and address pulses could be easily obtained from the distributor 10. After an address pulse has been applied to the address selector circuit 16, it is desirable that no further address pulses be applied to this circuit until the address for the next message is received. This is desirable in order to enable the system to use code combinations in the message which are similar to the address code combinations since 1200 different code combinations are to be used for the addresses, and to eliminate these combinations from the message might result in undue restrictions of the available combinations. Such disabling means are readily available, and one method which might be employed is to condition the system to be responsive to address pulses applied to the line 23 only after a predetermined number of characters following an end-of-message signal of the type commonly used in telegraph systems.

An end-of-message signal following a given message also should operate circuitry in the reperforators 19 to disable all the reperforators at the end of the message thus readying the system for reception of the next address and message.

Although the invention has been described in relation with a preferred embodiment thereof, it is to be understood that the above-described circuits are merely illustrative of the invention and are not intended to limit it thereto. It will be readily apparent to those skilled in the art that various modifications and changes may be made without departing from the scope of the invention as set forth in the appended claims.

What is claimed is:

1. In a communication system for the transmission of binary coded messages and having a plurality of devices for receiving said messages, apparatus for selectively directing individual messages to selected ones of said receiving devices in accordance with a binary coded address preceding each message, the information in said binary messages and said addresses being in the form of permutative code combinations having a plurality of parallel levels, said apparatus comprising a plurality of multistage storage registers arranged in parallel, the first stage of each of said registers being adapted to store the binary information of a different level of said permutative code combinations, the remaining stages of said registers each being arranged to receive and store the binary information appearing in the next preceding stage upon receipt of a common timing signal, and the last stage of said registers supplying successive code combinations to said receiving devices, said registers having sufficient capacity to store at least said address, a magnetic core storage matrix connected to the outputs of at least a portion of the stages of said storage registers, with each core in said matrix being connected to a different permutation of outputs, means for sampling said magnetic core storage matrix at predetermined intervals to obtain an output signal from said storage matrix representative of the information stored in said portion of the stages of said storage registers, and means responsive to said output signal for conditioning selected ones of said receiving devices to be responsive to the stored address and the ensuing message.

2. A message distribution system for distributing binary signals comprising binary coded messages each preceded by a binary coded address having $n$ characters, the information in said binary signals being in the form of permutative code combinations having a plurality of parallel levels, said system including a plurality of multistage shift registers equal in number to the number of said levels in said permutative code combinations and individually adapted to store the binary information in different levels of said permutative code combinations, each of said registers having the same number of stages and at least $n$ stages, means for successively supplying the binary signals comprising said coded addresses followed by the binary signals comprising the messages to the first stages of said plurality of shift registers, a plurality of receiving devices connected to the outputs of the last stages of said shift registers for receiving said binary signals, a magnetic core storage matrix having a plurality of cores equal in number to the number of addresses to be recognized, each of said cores being connected to a different permutation of outputs of a predetermined group of $n$ consecutive stages of said shift registers, means for sampling said cores at predetermined intervals for obtaining an output signal from the core corresponding to the information stored in said $n$ stages at the time the sample is taken, and a diode matrix connected to the outputs of said cores and providing signals in response to said core output signals to condition selected ones of said plurality of receiving devices to be responsive to said binary signals, the number of stages in said shift registers being sufficient to accommodate said conditioning of selected ones of said receiving devices before the storing of binary codes following those of an address in the first stages of said shift registers causes cancellation of the binary code of the first character of an address at the last of said stages.

References Cited in the file of this patent

UNITED STATES PATENTS

| | | |
|---|---|---|
| 2,659,879 | Pappenfus | Nov. 17, 1953 |
| 2,905,746 | Wampach | Sept. 22, 1959 |
| 3,051,787 | Parks | Aug. 28, 1962 |
| 3,064,237 | Schubert | Nov. 13, 1962 |

UNITED STATES PATENT OFFICE

CERTIFICATE OF CORRECTION

Patent No. 3,147,339 September 1, 1964

Sylvan Silberg

It is hereby certified that error appears in the above numbered patent requiring correction and that the said Letters Patent should read as corrected below.

Column 1, line 35, for "J. T. Auwaerter" read -- J. F. Auwaerter --; column 6, line 52, for "and", first occurrence, read -- to --.

Signed and sealed this 2nd day of February 1965.

(SEAL)
Attest:

ERNEST W. SWIDER
Attesting Officer

EDWARD J. BRENNER
Commissioner of Patents